(12) United States Patent
Day et al.

(10) Patent No.: US 7,990,668 B2
(45) Date of Patent: Aug. 2, 2011

(54) DEVICE PROTECTION USING TEMPERATURE COMPENSATION

(75) Inventors: Timothy Robert Day, Racine, WI (US); Daniel Patrick Roth, Pewaukee, WI (US)

(73) Assignee: Cooper Technologies Company, Houston, TX (US)

( * ) Notice: Subject to any disclaimer, the term of this patent is extended or adjusted under 35 U.S.C. 154(b) by 676 days.

(21) Appl. No.: 12/154,328

(22) Filed: May 22, 2008

(65) Prior Publication Data
US 2008/0291593 A1    Nov. 27, 2008

Related U.S. Application Data

(60) Provisional application No. 60/931,773, filed on May 25, 2007.

(51) Int. Cl.
*H02H 3/00* (2006.01)
*H02H 7/00* (2006.01)
(52) U.S. Cl. ............................................. 361/65; 361/79
(58) Field of Classification Search .................. 361/62, 361/65, 76, 79; 323/211; 702/65
See application file for complete search history.

(56) References Cited

U.S. PATENT DOCUMENTS

| | | | |
|---|---|---|---|
| 3,703,680 A * | 11/1972 | Frank et al. ................ | 323/210 |
| 3,990,019 A | 11/1976 | Crockett et al. | |
| 4,797,630 A | 1/1989 | Brown | |
| 4,910,631 A | 3/1990 | Murphy | |
| 5,422,561 A * | 6/1995 | Williams et al. ............ | 323/209 |
| 5,670,864 A * | 9/1997 | Marx et al. ................. | 323/211 |
| 5,839,093 A * | 11/1998 | Novosel et al. ............. | 702/59 |
| 6,181,113 B1 * | 1/2001 | Hu et al. .................... | 323/209 |
| 6,297,940 B1 * | 10/2001 | Wu ............................. | 361/79 |
| 6,613,169 B2 * | 9/2003 | Georgeson et al. ......... | 156/64 |
| 6,654,216 B2 * | 11/2003 | Horvath et al. ............. | 361/65 |
| 7,616,005 B2 * | 11/2009 | Kalyuzhny et al. ......... | 324/522 |
| 7,688,042 B2 * | 3/2010 | Wong et al. ................. | 323/209 |

OTHER PUBLICATIONS

International Search Report, mailed Sep. 2, 2008, for corresponding PCT Application No. PCT/US2008/006541, which lists references cited therein.
Cooper Power Systems, Edison Pro Relay Schemes, UCP-300 and -301 Capacitor Bank Protection Schemes, Electrical Apparatus, 160-40, Mar. 2000 © 1999, 2 pages.

* cited by examiner

*Primary Examiner* — Jared J Fureman
*Assistant Examiner* — Christopher J Clark
(74) *Attorney, Agent, or Firm* — King & Spalding LLP (57) ABSTRACT

Device protection using temperature compensation. A logic module associated with groups of capacitors adjusts complex impedance planes associated with the capacitor groups to account for ambient temperature variations. In particular, the logic module is configured to adjust a center of a circle of each complex impedance plane based on an average impedance. The average impedance for a selected capacitor group includes impedance measurements for groups other than the selected group, to prevent capacitor failures in that group from skewing the average. The logic module can adjust the circle center in response to changes in average impedance over periods of time. For example, the logic module can filter measured differences in average impedance using a low pass filter, to distinguish slow impedance changes caused by temperature variations and rapid impedance changes caused by capacitor failures. The logic module can adjust the circle center in accordance with the filtered difference value.

29 Claims, 7 Drawing Sheets

Prior Art

DEVICE PROTECTION USING TEMPERATURE COMPENSATION

RELATED APPLICATION

This application claims priority under 35 U.S.C. §119 to co-pending U.S. Provisional Patent Application No. 60/931,773, entitled "Device Protection Using Temperature Compensation," filed May 25, 2007, the complete disclosure of which is hereby fully incorporated herein by reference.

TECHNICAL FIELD

The invention relates generally to device protection, and more particularly, to protecting an electric device using temperature compensation.

BACKGROUND

Utilities often connect capacitor banks to electric power systems to reduce system losses and improve voltage regulation. Practical manufacturing limitations for individual capacitor units and typical capacitance and voltage requirements of power systems favor capacitor bank designs as a series/parallel matrix of capacitor units. The matrix includes multiple strings of in-series capacitor units connected in a parallel arrangement. The series connections of the capacitor units satisfy the voltage requirements; the parallel connections of the strings satisfy the capacitance requirements.

Oftentimes, capacitor banks are connected to electric power systems in phase-neutral—rather that in-series, or in-line—arrangements. Such arrangements are commonly referred to as "shunt" configurations. The capacitor bank may be grounded with a neutral point of the capacitor bank being connected to a power system ground via an intentionally low impedance tie.

A popular capacitor bank construction style is a "fuseless capacitor bank" design. This design includes a reduced physical size and cost relative to other traditional capacitor bank designs because it does not include any fuses for isolating failed capacitor units. Instead, the fuseless capacitor bank design exploits the failure mode of a capacitor, namely, a short circuit. If a capacitor unit within the capacitor bank fails, internal capacitor bank voltages will be altered, increasing across the remaining, functioning units within the effected string. If the number of units per string is large, the increased voltage due to a single unit failure is manageable. Eventually, however, the increased voltage may reach damaging thresholds if more units in the string fail. If this elevated voltage is not detected, and, when necessary, the entire capacitor bank is not de-energized in response, cascading and often catastrophic failures may result.

One way to determine whether potentially damaging voltage levels exist is to measure the voltage stress across each unit within the capacitor bank. However, this technique is impractical due to the large number of units present in a typical capacitor bank. Therefore, existing protection systems generally employ indirect measurements, measuring voltages external to the capacitor bank and possibly current flows through various branches in the capacitor bank, along with well-understood equations, to estimate internal voltage levels.

These measurements assume the application of impedance-based protection as the means to detect failure of capacitor units. The general Ohms law expression is V=I*Z, where the voltage (V) measured across any electrical component is equal to the current flow (I) through the component times the impedance (Z) of the component. Impedance for each string of the capacitor bank may be calculated based on measured line-ground voltage and string current values as follows:

Measured String Impedance=$Z_{meas,n}$=V÷$I_n$, where "n" represents the nth string. This measurement is repeated for each nth string, where n=1, 2, 3, . . . , n, . . . , CNT. CNT is a total count of the strings (per phase). Although illustrated in FIG. 2 as having six strings per phase, a person having ordinary skill in the art and having the benefit of the present disclosure will recognize that any number of strings per phase may be utilized. A response characteristic of a protective device associated with the capacitor bank may be plotted on a complex impedance plane, with capacitive resistance (R) plotted on the x axis and capacitive reactance (jX) plotted on the y axis.

Figure 1:
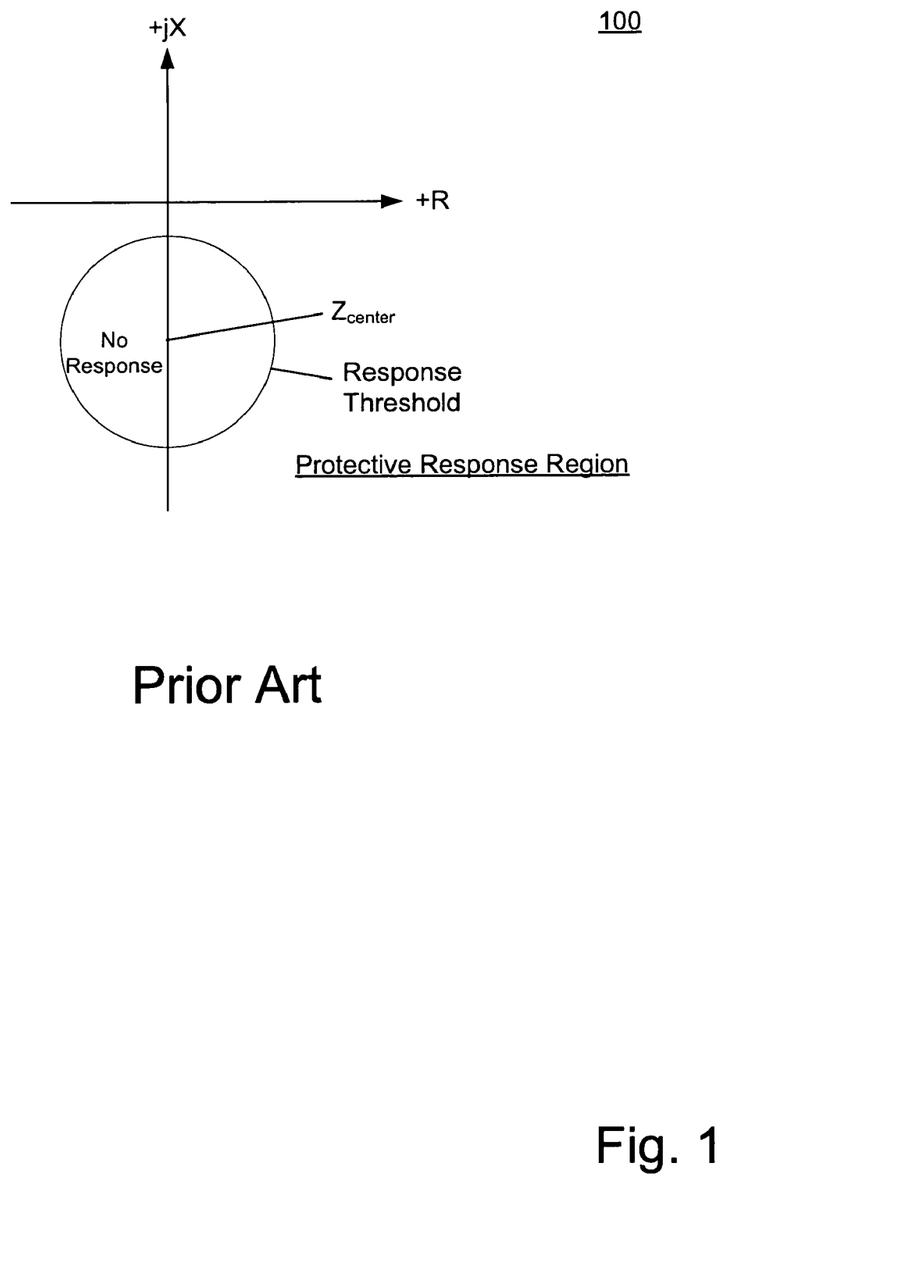
FIG. 1 illustrates a complex impedance plane.

FIG. 1 illustrates a traditional complex impedance plane 100 for a capacitor string. $Z_{nom}$ represents the nominal impedance of the string. This value is entirely capacitive reactance, as seen by the –jX placement on the impedance plane 100. An operator can calculate $Z_{nom}$ from nameplate data of the capacitor units in the capacitor bank. Initially, $Z_{nom}$ equals a value in the center of a plotted circle, $Z_{center}$. During energized operation of a capacitor bank with no failed units (a "healthy bank"), the measured impedance should be nearly equal to the center: $Z_{meas,n}$=$Z_{center}$. If the capacitor bank includes failed units, $Z_{meas,n}$ will move from the center of the circle, towards an outer edge of the circle. If $Z_{meas,n}$ passes the outer edge of the circle, a system failure is detected. Detection sensitivity may be adjusted by altering the radius of the circle. A small radius corresponds to higher sensitivity than a large radius.

Typically, polyethylene film separates internal aluminum foil plates of each capacitor. The polyethylene film expands and contracts with temperature. This temperature dependence results in changes in capacitance and, therefore, capacitor bank impedance. As temperature goes up, impedance goes up and capacitance goes down. The net capacitor bank impedance change caused by a temperature fluctuation can cause $Z_{meas,n}$ to move outside the circle, resulting in detection of a system failure. Such a detection is a "false alarm" because it resulted from a temperature fluctuation and not a system failure.

Conventional approaches to preventing these false alarms include expanding the size of the circle in the impedance plane 100. If the circle is expanded enough, temperature-induced impedance changes will not result in failure detection. This approach does not discriminate between impedance changes due to temperature and those due to capacitor unit failures. Rather, it de-sensitizes overall protection, preventing false alarms caused by temperature changes but also reducing the ability to detect bona fide unit failures. Thus, unit failures resulting in minor impedance changes may not be detected.

Another conventional approach is to directly measure ambient temperature using a temperature transducer mounted externally to the capacitor bank. The size and location of the circle in the impedance plane 100 is adjusted based on the measured temperature, in accordance with a theoretical rate of impedance change per temperature variant. The drawbacks of this approach include the high cost and low reliability of adding the temperature transducer components to the system. Another drawback is that this approach does not account for possible discrepancies between the temperature at the transducer location and the temperatures within the capacitor bank. Partial shading of various portions of the bank may lead to non-homogenous capacitor temperatures and the inability to properly calculate impedance changes.

Therefore, a need exists in the art for a system and method for protecting an electric device using temperature compensation. In particular, a need exists in the art for a system and method for compensating for temperature-induced capacitance variations in a capacitor bank.

SUMMARY

The invention provides systems and methods for protecting an electric device using temperature compensation. In particular, the invention provides systems and methods for adjusting complex impedance planes associated with groups of capacitors of a capacitor bank to account for ambient temperature variations. For example, each group may be a string of capacitors and/or a group of capacitors associated with the same phase of electric power.

A protective device coupled to the groups of capacitors includes a logic module configured to adjust each complex impedance plane. The logic module can exploit one or more of the following characteristics to discriminate between temperature-induced impedance changes (that do not require a protective response) and unit-failures within the capacitor bank (that require a protective response): (1) temperature variations cause impedances of all groups to change because all groups are exposed to the same general environment, (2) impedance changes due to a particular capacitor failure occur only within the group of the failed capacitor, (3) the time constant associated with temperature-induced impedance variations is many minutes to hours; the time constant associated with capacitor-failure impedance variations is seconds.

Each group of capacitors has an associated complex impedance plane, such as the complex impedance plane illustrated in FIG. 1. Each complex impedance plane includes a circle having a center, $Z_{center}$, and a radius. The complex impedance planes may be used to detect capacitor failures. Impedance measurements within a complex impedance plane circle indicate that the capacitor group is "healthy"; impedance measurements outside of the complex impedance plane circle indicate a failure within the capacitor group. Thus, failure detection sensitivity of the complex impedance plane is inversely related to the radius of the circle.

Initially, $Z_{center}$ may equal a nominal impedance ("$Z_{nom}$") that is calculated based on expected characteristics of the capacitor group. Alternatively, $Z_{center}$ may equal a measured impedance ("$Z_{meas,n}$") that is calculated based on measured voltage and current levels at a time of commissioning, initializing, and/or re-energizing the capacitor bank. The logic module is configured to adjust $Z_{center}$ to compensate for temperature changes. The logic module is configured to perform this adjustment without using an external temperature transducer.

The logic module can adjust $Z_{center}$ for a particular capacitor group based on an average impedance of other capacitor groups in the same capacitor bank. For example, the logic module can adjust $Z_{center}$ for a first capacitor group of six capacitor groups based on an average impedance of the second, third, fourth, fifth, and sixth capacitor groups. Temperature dependency, which influences all groups more or less equally, is manifest in the average. Eliminating contribution for the particular group to be adjusted prevents actual capacitor failures in that group from skewing the average, thereby inaccurately adjusting $Z_{center}$.

The logic module can monitor changes in the average impedance to determine whether temperature compensation is necessary. For example, the logic module can compare an average impedance level measured at the time of monitoring to a reference impedance level, such as $Z_{nom}$. The logic module can filter the difference between these measurements ("$\Delta Z_{avg,n}$") using a low pass filter.

The low pass filter is a digital component configured to filter input according to an established time factor. The time factor of the low pass filter can allow the logic module to distinguish between slow impedance changes caused by temperature variations and rapid impedance changes caused by capacitor failures. Being able to distinguish between these changes can allow the logic module to calibrate the complex impedance plane to compensate for temperature variations, without skewing the complex impedance plane based on capacitor failures. The output of the low pass filter is referred to herein as "$\Delta Z_{TC,n}$".

The logic module can adjust $Z_{center}$ in accordance with the output from the low pass filter. For example, the logic module can move $Z_{center}$ to a value equal to $Z_{nom}+\Delta Z_{TC,n}$ or $\Delta Z_{meas,n}+\Delta Z_{TC,n}$. Alternatively, the logic module can move $Z_{center}$ to an impedance level measured during monitoring, such as the measured average impedance level for the other capacitor groups. This movement calibrates the complex impedance plane circle for use in subsequent failure detection.

These and other aspects, features and embodiments of the invention will become apparent to a person having ordinary skill in the art upon consideration of the following detailed description of representative embodiments exemplifying the best mode for carrying out the invention as presently perceived.

BRIEF DESCRIPTION OF THE DRAWINGS

For a more complete understanding of the present invention and the advantages thereof, reference is now made to the following description, in conjunction with the accompanying figures briefly described as follows.

DETAILED DESCRIPTION OF EXEMPLARY EMBODIMENTS

The invention is directed to systems and methods for protecting an electric device. In particular, the invention is directed to systems and methods for protecting an electric device using temperature compensation.

The invention includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 2:
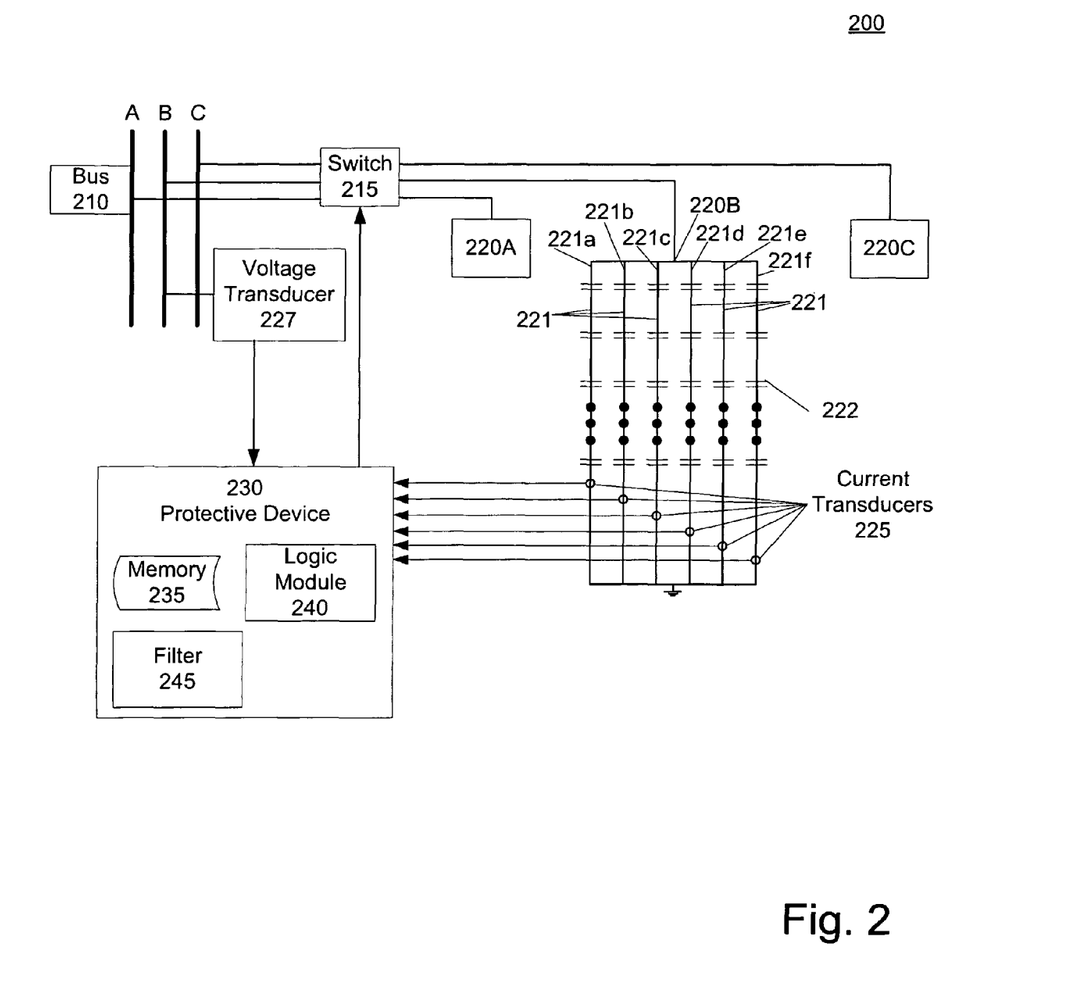
FIG. 2 is a block diagram depicting a system for protecting an electric device using temperature compensation, in accordance with certain exemplary embodiments.

FIG. 2 illustrates a system 200 for protecting an electric device using temperature compensation, in accordance with certain exemplary embodiments. The system 200 includes a high voltage bus 210 connected to a three-phase capacitor bank 220 via a switch 215. The switch 215 is configured to selectively connect and disconnect power to the capacitor bank 220 from the bus 210. For example, the switch 215 may disconnect power to the capacitor bank 220 when damaging conditions within the capacitor bank 220 are detected. In certain exemplary embodiments, a protective device 230 connected to the switch 215 is configured to instruct the switch 215 to disconnect the power to the capacitor bank 220 upon detecting such a condition.

Each phase 220A, 220B, and 220C of the capacitor bank 220 includes multiple strings 221 of in-series capacitors 222 connected in a parallel arrangement. Current transducers 225 measure currents flowing within each string 221. Similarly, a voltage transducer 227 measures voltage from phase to ground for each phase A, B, and C of the bus 210. The system 200 is described in more detail hereinafter with reference to the methods illustrated in FIGS. 3-5.

Figure 3:
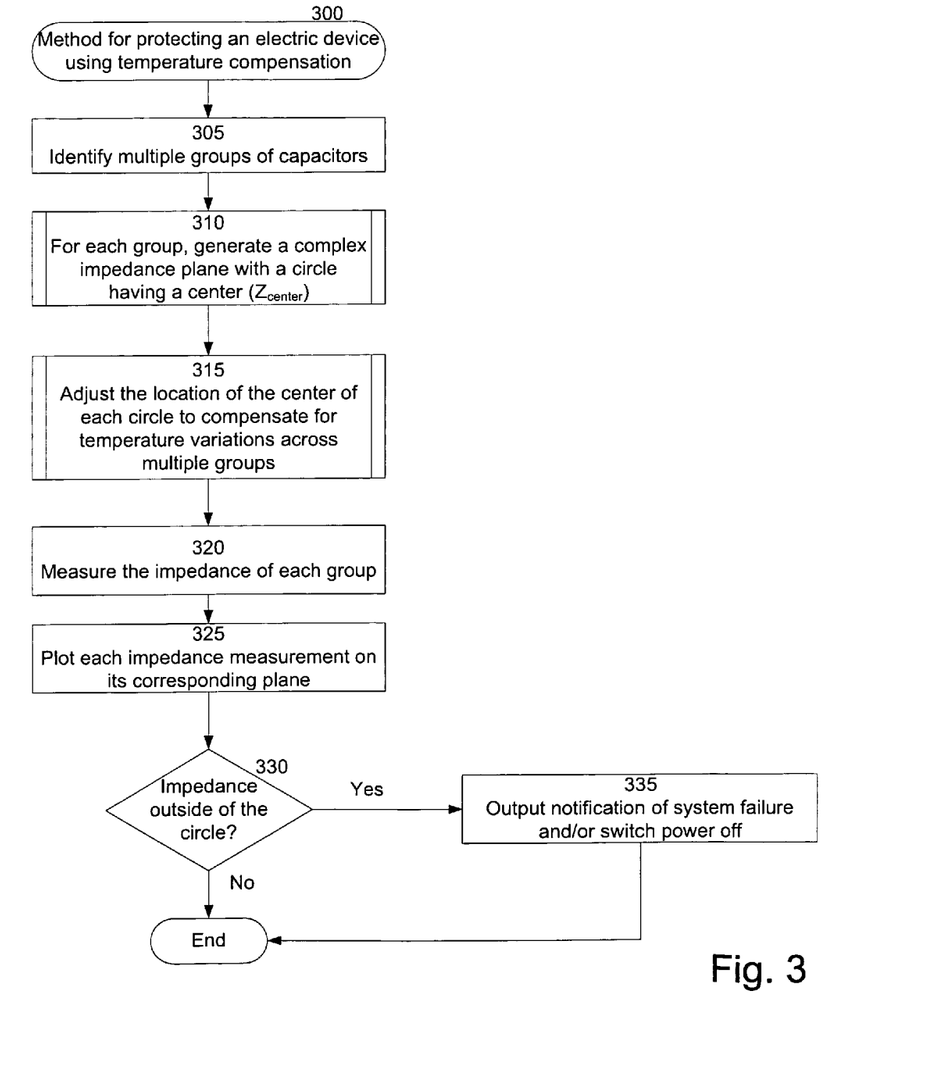
FIG. 3 is a flow chart depicting a method for protecting an electric device using temperature compensation, in accordance with certain exemplary embodiments.

FIG. 3 is a method 300 for protecting an electric device using temperature compensation, in accordance with certain exemplary embodiments. The exemplary method 300 is illustrative and, in alternative embodiments of the invention, certain steps can be performed in a different order, in parallel with one another, or omitted entirely, and/or certain additional steps can be performed without departing from the scope and spirit of the invention. The method 300 is described below with reference to FIGS. 2 and 3.

In step 305, the protective device 230 identifies multiple groups of capacitors 222 to protect. For example, a logic module 240 of the protective device 230 can identify multiple strings 221 of capacitors 222 to protect. In step 310, the logic module 240 generates a complex impedance plane for each identified group. Each complex impedance plane includes capacitive resistance (R) plotted on the x axis and capacitive reactance (jX) plotted on the y axis. For example, each complex impedance plane can be similar to the complex impedance plane 100 described previously with reference to FIG. 1.

Each complex impedance plane includes a circle. A center of the circle is referred to herein as $Z_{center}$. As described hereinafter, if a measured impedance of one or more of the groups of capacitors 222 falls outside its corresponding complex impedance plane circle, the logic module 240 can detect a system failure. Step 310 is described in more detail hereinafter with reference to FIG. 4.

In step 315, the logic module 240 adjusts the location of the center of each complex impedance plane circle to compensate for temperature variations across the capacitor groups. In other words, the logic module 240 calibrates each complex impedance plane circle to account for impedance and capacitance changes caused by temperature variations in the capacitor bank 220. For example, the logic module 240 can adjust the location of the $Z_{center}$ associated with a particular string 221 to compensate for temperature variations across the strings 221a-221f. Step 315 is described in more detail hereinafter with reference to FIG. 5.

In step 320, the logic module 240 measures the impedance of each group of capacitors 222 identified in step 305. For example, the logic module 240 can measure the impedance of a string 221 by arranging (1) measured line-ground voltage from the voltage transducer 227, and (2) string current from the current transducer 225 associated with the selected string 221 in the Ohm-law expression: measured string impedance ($Z_{meas,n}$) equals $V \div I_n$, where "n" represents the nth string 221.

In step 325, the logic module 240 plots each impedance measurement from step 320 on its corresponding (adjusted) complex impedance plane. In step 330, the logic module 240 determines whether any of the impedance measurements has been plotted (in step 325) outside of its corresponding complex impedance plane circle. For example, an impedance measurement for a selected string 221 may be plotted outside of its corresponding complex impedance plane circle if there is an abnormal increase or decrease in capacitive reactance or resistance of the selected group of capacitors 222. Similarly, the measured impedance may be plotted within the circle if the measured impedance falls within an acceptable range.

If the logic module 240 determines in step 330 that the impedance is not outside of the circle, the method 300 ends. If the logic module 240 determines in step 330 that the impedance is outside of the circle, the method 300 branches to step 335. In step 335, the logic module 240 outputs a notification of system failure. For example, the logic module 240 can cause a visual, auditory, or tactile output to notify an operator of the system failure. In addition, or in the alternative, the logic module 240 can cause the switch 215 to disconnect power to the capacitor bank 220 in step 335. For example, disconnecting power can prevent the capacitor bank 220 from operating with a dangerously high internal voltage level.

In certain exemplary embodiments, the logic module 240 can continuously and/or periodically perform some or all of steps 315-335. For example, the logic module 240 can continuously calibrate the complex impedance plane based on temperature variations. Such continuous calibration can result in more accurate failure detection with less false alarms than the traditional approaches described previously.

Figure 4:
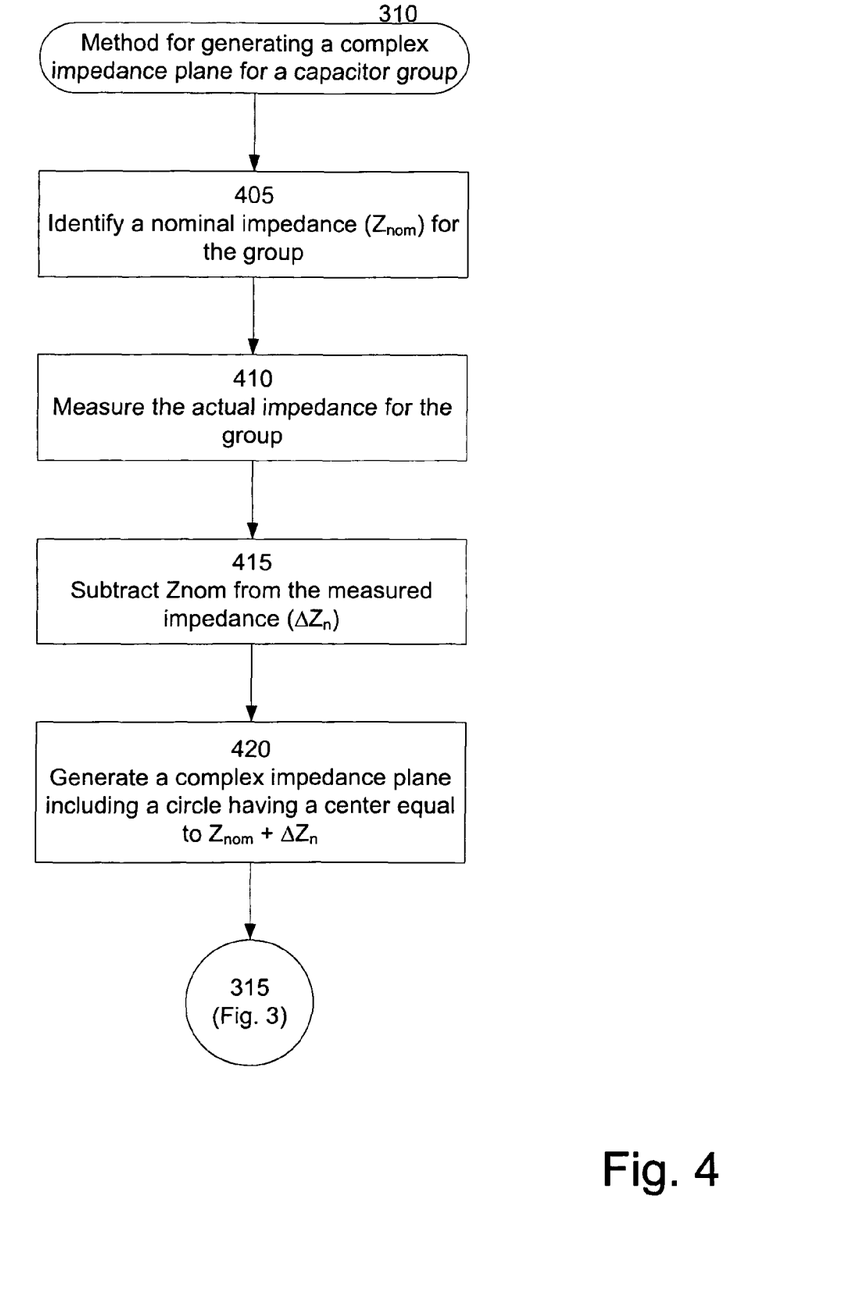
FIG. 4 is a flow chart depicting a method for generating a complex impedance plane for a capacitor group, in accordance with certain exemplary embodiments.

FIG. 4 is a flow chart depicting a method 310 for generating a complex impedance plane for a capacitor group, in accordance with certain exemplary embodiments, as referred to in step 310 of FIG. 3. The exemplary method 310 is illustrative and, in alternative embodiments of the invention, certain steps can be performed in a different order, in parallel with one another, or omitted entirely, and/or certain additional steps can be performed without departing from the scope and spirit of the invention. The method 310 is described below with reference to FIGS. 2-4.

In step 405, the logic module 240 identifies a nominal impedance ("$Z_{nom}$") for the capacitor group. $Z_{nom}$ is a calculated value based on expected characteristics of the capacitors 222 within the group. For example, $Z_{nom}$ can be calculated based on nameplate data of the capacitors 222.

In step 410, the logic module 240 measures the actual impedance for the group ("$Z_{meas,n}$"). For example, when the group is a string 221 of capacitors 222, the actual impedance can be calculated as follows: $Z_{meas,n} = V \div I_n$, where "V" represents the line to ground voltage measured by the voltage transducer 227, and "$I_n$" represents the current of the string 221, as measured by the current transducer 225 associated with the string. In certain exemplary embodiments, step 410 may be performed upon commissioning, initializing, or re-energizing the capacitor bank 220.

In step 415, the logic module 240 calculates a difference ("$\Delta Z_n$") between the nominal impedance and the measured, actual impedance by subtracting $Z_{nom}$ from $Z_{meas,n}$. In step 420, the logic module 240 generates a complex impedance plane that includes a circle having a center plotted at $Z_{nom}$ plus $\Delta Z_n$. In other words, the logic module 240 generates a complex impedance plane that includes a circle having a center at the measured, actual impedance value ($Z_{meas,n}$). Placing the circle at $Z_{meas,n}$ rather than $Z_{nom}$ allows the complex impedance plane to be a more accurate failure detection tool by accounting for differences between capacitors' 222 measured capacitances and expected capacitances and by accounting for measurement errors in magnitude and/or phase of the current transducers 225, voltage transducer 227, and protective device 230.

The failure detection sensitivity of the protective device 230 is inversely related to the radius of the circle plotted on the complex impedance plane; a small radius corresponds to higher sensitivity than a large radius. In certain exemplary embodiments, the logic module 240 can select the radius of the circle based on one or more rules stored in a memory 235 of the protective device 230. For example, upon commissioning, initializing, or re-energizing the capacitor bank 220, an operator can establish a rule specifying the circle radius. The circular characteristic of the complex impedance plane is advantageous because it is numerically efficient and detects both expected decreases in impedance as capacitors 222 fail and also abnormal increases in capacitive reactance or resistance.

In certain exemplary embodiments, the protective device 230 can employ a complex impedance plane with multiple, concentric circles. For example, an inner circle having a small radius can be used to trigger an alarm upon a small impedance change, and an outer circle having a larger radius can be used to de-energize the capacitor bank 220 upon a large impedance change. Centers of each circle may or may not be adjusted to account for measurement differences/errors, as described previously, or to account for temperature changes, as described hereinafter.

The logic module 240 can store the complex impedance plane in the memory 235.

From step 420, the method 310 continues to step 315 of FIG. 3.

Figure 5:
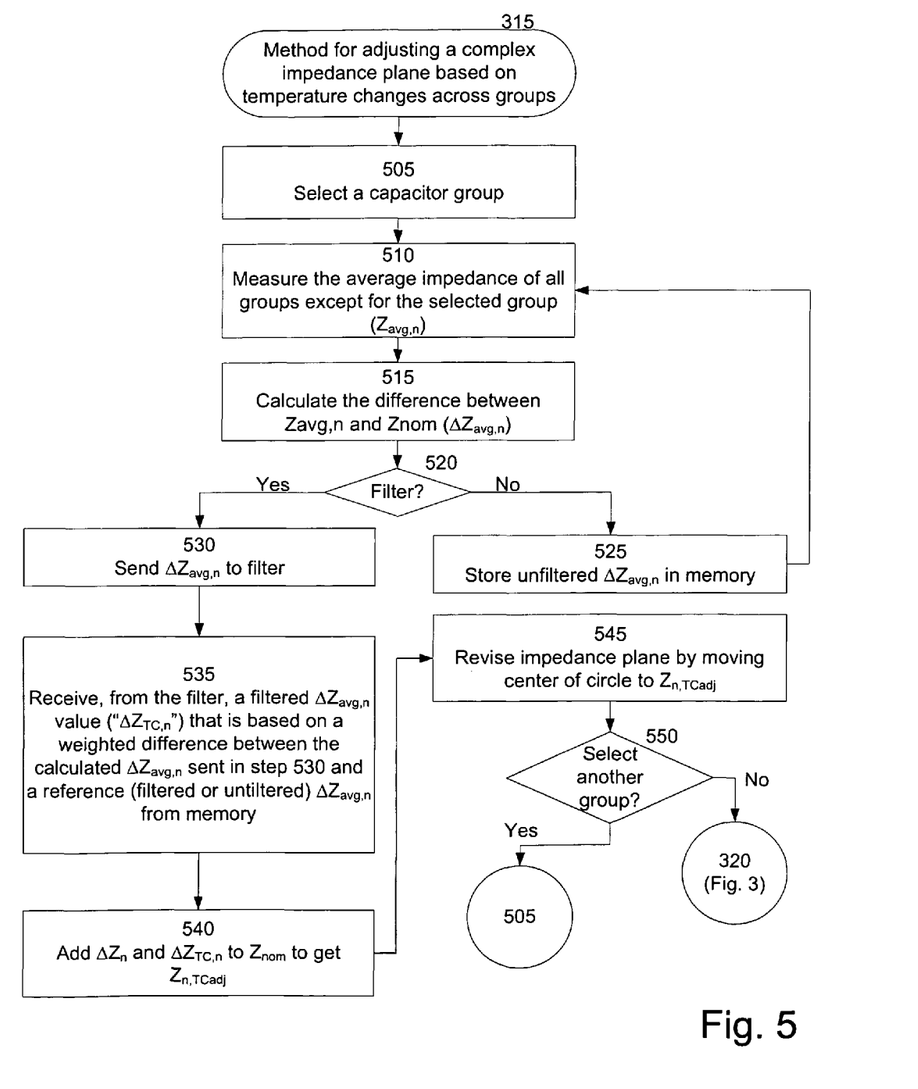
FIG. 5 is a flow chart depicting a method for adjusting a complex impedance plane based on temperature changes across capacitor groups, in accordance with certain exemplary embodiments.

FIG. 5 is a flow chart depicting a method 315 for adjusting a complex impedance plane based on temperature changes across capacitor groups, in accordance with certain exemplary embodiments, as referred to in step 315 of FIG. 3. The exemplary method 310 is illustrative and, in alternative embodiments of the invention, certain steps can be performed in a different order, in parallel with one another, or omitted entirely, and/or certain additional steps can be performed without departing from the scope and spirit of the invention. The method 310 is described below with reference to FIGS. 2-4.

In step 505, the logic module 240 selects a capacitor group for which to adjust an associated complex impedance plane. In step 510, the logic module 240 measures the average impedance ("$Z_{avg,n}$") of all groups except for the selected group. For example, if the logic module 240 selects a string 221c in step 505, the logic module 240 can measure the average impedance of strings 221a-221b and 221d-221f in step 510.

In certain exemplary embodiments, the logic module 240 can measure the average impedance based on information from the voltage transducer 227 and the current transducers 225 associated with the non-selected groups of capacitors 222. For example, the logic module 240 can calculate the average impedance for string 221c as follows:

$$Zavg, 3 = \frac{(CNT - 1) * V}{\sum_{n \neq 3}^{CNT} In} = \frac{5V}{I1 + I2 + I4 + I5 + I6},$$

where "n" equals the nth string 221 and "CNT" equals the total number of capacitor groups (identified in step 305 of FIG. 3). In this exemplary calculation, "$I_1$" equals a current measurement for string 221a, "$I_2$" equals a current measurement for string 221b, "$I_4$" equals a current measurement for string 221d, "$I_5$" equals a current measurement for string 221e, "$I_6$" equals a current measurement for string 221f, and "CNT" equals six. Average impedance for other strings 221a-221b and 221d-221f may be determined using a similar calculation.

By measuring average impedance of all groups except for the selected group, the measurement of step 510 eliminates contribution of the selected group from the average calculation. Therefore, a capacitor 222 failure in the selected group will not skew the average impedance value.

In certain exemplary embodiments, the logic module 240 also can eliminate contribution from any failed capacitor groups in the average impedance calculation. For example, if a failure condition is detected in capacitor string 221b, that string's 221b contribution to the average may be removed. This removal can prevent a potentially corrupted impedance value for the failed capacitor string 221b from adversely influencing calculations for other, "healthy" strings 221. Extending the previous numerical example for string 221c, consider the case whereby sufficient capacitors 222 in string 221e fail that a failure condition is detected for that string 221e. The calculation for the average impedance used in string 221c can be modified as follows:

$$Zavg, 3 = \frac{(CNT - 2) * V}{\sum_{n \neq 3 \, or \, 5}^{CNT} In} = \frac{4V}{I1 + I2 + I4 + I6},$$

where "n" equals the nth string 221 and "CNT" equals the total number of capacitor groups (identified in step 305 of FIG. 3).

In certain exemplary embodiments, the logic module 240 can require a minimum number of "healthy" strings 221 for temperature compensation. For example, the logic module 240 can disable temperature compensation if insufficient healthy strings 221 are present to yield a suitable average. The logic module 240 may disable temperature compensation in any number of ways known to a person of ordinary skill in the art having the benefit of the present disclosure, including forcing a compensation value $\Delta Z_{TC,n}$, described below, to equal zero.

In certain exemplary embodiments, the logic module 240 can eliminate contribution from certain of the capacitor groups, regardless of whether the eliminated capacitor groups are "healthy." For example, the logic module 240 can calculate average impedance using only a sub-set of the capacitor groups.

In step 515, the logic module 240 calculates the difference between the average impedance ($Z_{avg,n}$) measured in step 510 and a reference impedance, such as the nominal impedance ($Z_{nom}$) identified in step 405 of FIG. 4 for the capacitor group selected in step 505. In certain exemplary embodiments the nominal impedance may be the same or different from capacitor group to capacitor group. The difference calculated in step 515 is referred to herein as "$\Delta Z_{avg,n}$".

In step 520, the logic module 240 determines whether to have the $\Delta Z_{avg,n}$ value filtered by a low pass filter 245 of the protective device 230. The low pass filter 245 is a digital component configured to filter input according to an established time factor. For example, the low pass filter 245 can be a digital, single-pole, infinite-impulse response type filter with a time factor of 0.0005.

The time factor corresponds to a realization cycle of the low pass filter 245. The realization cycle is the time it takes for the output of the low pass filter 245 ("$\Delta Z_{TC,n}$") to equal a particular input of the low pass filter 245. For example, a realization cycle can be approximately one hour.

During the realization cycle, the low pass filter 245 can receive multiple $\Delta Z_{avg,n}$ measurements from the logic module 240. Upon receiving a $\Delta Z_{avg,n}$ measurement, the low pass filter 245 can subtract an immediately previous $\Delta Z_{TC,n}$ value of the low pass filter 245 from the received $\Delta Z_{avg,n}$ measurement and multiple that difference by the time factor. For example, assuming a time factor of 0.0005, if the $\Delta Z_{avg,n}$ measurement is 1 and the immediately previous $\Delta Z_{TC,n}$ value is 0, then the low pass filter 245 can multiple 1 times the 0.0005 to get 0.0005. Then, the low pass filter 245 can add that value to the immediately previous $\Delta Z_{TC,n}$ value to get a new $\Delta Z_{TC,n}$ value. Following the previous example, the low pass filter 245 can add 0 plus 0.0005 to get a new $\Delta Z_{TC,n}$ value of 0.0005. The low pass filter 245 can repeat these calculations for each received $\Delta Z_{avg,n}$ measurement.

Until completion of the realization cycle, the $\Delta Z_{TC,n}$ value output by the low pass filter 245 will equal a value less than the input $\Delta Z_{avg,n}$ value, in accordance with the time factor. Under the previous example, if each received $\Delta Z_{avg,n}$ measurement is approximately 1, then the low pass filter 245 may eventually output a $\Delta Z_{TC,n}$ value of 1, at the end of the realization cycle. As described hereinafter, the logic module 240 is configured to adjust the complex impedance plane circle associated with the selected capacitor group in accordance with the output of the low pass filter 245. Slowly increasing the output of the low pass filter 245 during the realization cycle allows incremental, relatively slow adjustment of the complex impedance plane circle. A person of ordinary skill in the art having the benefit of the present disclosure will recognize that the time factor and realization cycle values discussed previously are merely exemplary and that each of these values may vary widely from those disclosed herein without departing from the spirit and scope of the invention.

In certain exemplary embodiments, the time factor can vary depending on the state of the capacitor. For example, the low pass filter 245 can use a higher time factor at a time of commissioning the capacitor bank 220 than during normal operation of the capacitor bank 220, to cause rapid realization of the $\Delta Z_{avg,n}$ value—and thus, rapid adjustment of the complex impedance plane circle.

The time factor of the low pass filter 245 can allow the logic module 240 to ignore rapid changes in average impedance. Whereas the typical time constant associated with temperature-induced impedance variations is many minutes to hours, the typical time constant associated with impedance variations caused by capacitor failures is only a few seconds. The time factor of the low pass filter 245 can allow the logic module 240 to distinguish between slow impedance changes caused by temperature variations and rapid impedance changes caused by capacitor failures. Being able to distinguish between these changes can allow the logic module 240 to calibrate the complex impedance plane to compensate for temperature variations, without skewing the complex impedance plane based on capacitor failures. In certain alternative exemplary embodiments, the low pass filter 245 and protective device 230 can be separate components.

If the logic module 240 determines in step 520 not to have the $\Delta Z_{avg,n}$ value filtered, the method 315 continues to step 525. In step 525, the protective device 230 and/or low pass filter 245 store the unfiltered $\Delta Z_{avg,n}$ value in the memory 235. As described hereinafter, this unfiltered $\Delta Z_{avg,n}$ value may be used as a baseline value in subsequent impedance evaluations.

In certain exemplary embodiments, the logic module 240 may determine (in step 520) not to have the $\Delta Z_{avg,n}$ value filtered if the $\Delta Z_{avg,n}$ value was measured upon initializing or re-energizing the capacitor bank 220. For example, the logic module 240 and/or an operator of the protective device 230 can cause the $\Delta Z_{avg,n}$ value to be stored in the memory 235 without having the $\Delta Z_{avg,n}$ value pass through the low pass filter 245. Alternatively, the logic module 240 can send the $\Delta Z_{avg,n}$ value to the low pass filter 245 with the instruction that the output of the low pass filter 245 must equal the input to the low pass filter 245. Thus, the low pass filter 245 will output an unaltered $\Delta Z_{avg,n}$ value for storage in the memory 235. For simplicity, this unaltered $\Delta Z_{avg,n}$ value and the $\Delta Z_{avg,n}$ value measured in step 510 are interchangeably referred to herein as the "unfiltered $\Delta Z_{avg,n}$ value."

The method 315 branches back to step 510 to re-measure the average impedance of the non-selected groups. In certain exemplary embodiments, this re-measurement can allow monitoring for temperature-induced impedance changes after establishing a base $\Delta Z_{avg,n}$ value in step 525. For example, the re-measurement can allow monitoring after commissioning, initializing, or re-energizing the capacitor bank 220.

If the logic module 240 determines in step 520 to have the $\Delta Z_{avg,n}$ value filtered, the method 315 branches to step 530. In step 530, the logic module 240 sends the $\Delta Z_{avg,n}$ value to the low pass filter 245. For example, the logic module 240 can send a signal with the $\Delta Z_{avg,n}$ value to the low pass filter 245.

In step 535, the logic module 240 receives a $\Delta Z_{TC,n}$ value from the low pass filter 245. As described previously, in connection with step 520, the $\Delta Z_{TC,n}$ value corresponds to a change in average impedance over time. Immediately following commissioning, initializing, or re-energizing the capacitor bank 220, the $\Delta Z_{TC,n}$ value may be zero or close to zero; over time, the $\Delta Z_{TC,n}$ value can become non-zero as the capacitor groups undergo impedance changes. For example, an ambient temperature change that causes a like impedance level across the capacitor groups can cause the $\Delta Z_{TC,n}$ value to be non-zero.

In step 540, the logic module 240 calculates an adjusted center value ("$Z_{n,TCadj}$") for the complex impedance plane circle associated with the selected group by adding the $\Delta Z_{TC,n}$ value, the corresponding $\Delta Z_n$ value (from step 415 of FIG. 4), and the corresponding $Z_{nom}$ value (from step 405 of FIG. 4) together. As described previously, in connection with step 420 of FIG. 4, adding the $\Delta Z_n$ value can calibrate the complex impedance plane circle to account for (a) differences between capacitors' 222 expected capacitances and measured capacitances at the time of commissioning, initializing, or re-energizing the capacitor bank 220, and/or (b) measurement errors in magnitude and/or phase of the current transducers 225, voltage transducer 227, and protective device 230. Adding the $\Delta Z_{TC,n}$ value calibrates the complex impedance plane circle to account for temperature-induced impedance changes across capacitor groups.

In step 545, the logic module 240 revises the complex impedance plane created in step 420 by moving the center of the complex impedance plane circle to the adjusted center value, $Z_{n,TCadj}$ calculated in step 540. In step 550, the logic module 240 determines whether to select another capacitor group for which to adjust an associated complex impedance plane. For example, the logic module 240 can adjust a complex impedance plane associated with each capacitor group identified in step 305 of FIG. 3. In certain exemplary embodiments, the logic module 240 can store the revised complex impedance plane in the memory 235.

If the logic module 240 determines in step 550 not to select another group, the method 315 continues to step 320 of FIG. 3, described previously. If the logic module 240 determines in step 550 to select another group, the method 315 branches to step 505 to select the other group.

Figure 6:
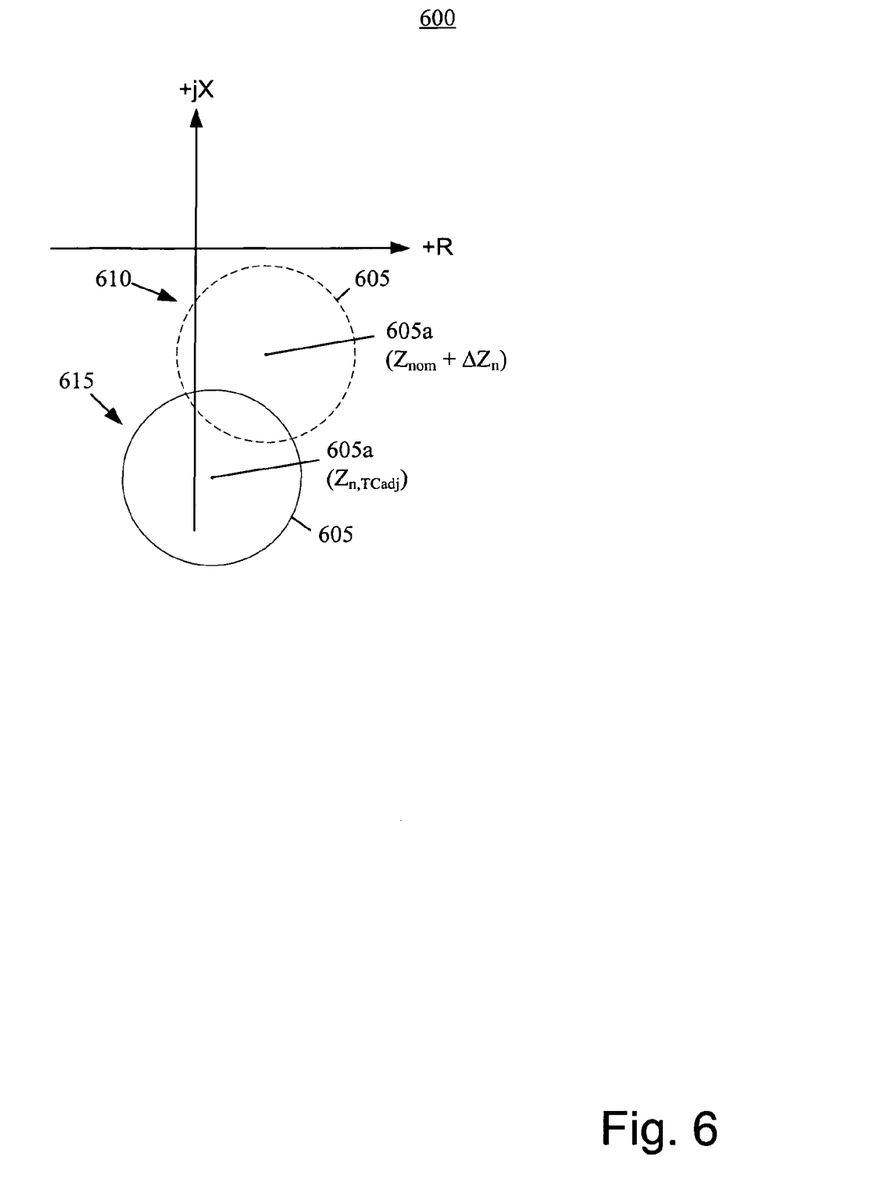
FIG. 6 illustrates a complex impedance plane with a circle that is calibrated from a first position to a second position to account for a temperature-induced impedance change, in accordance with certain exemplary embodiments.

FIG. 6 illustrates a complex impedance plane 600 with a circle 605 that is calibrated from a first position 610 to a second position 615 to account for a temperature-induced impedance increase, in accordance with certain exemplary embodiments. In the first position 610, a center 605a of the circle 605 is located at a value equal to $Z_{nom}+\Delta Z_n$. As described previously, in connection with step 420 of FIG. 4, this location corresponds to a measured, actual impedance value ($Z_{meas,n}$) of a group of capacitors at a first time. For example, the location of the center 605a of the circle 605, in the first position 610, can correspond to a measured, actual impedance value of a string 221 of capacitors 222 of a capacitor bank 220 upon commissioning, initializing, or re-energizing the capacitor bank 220.

In certain alternative exemplary embodiments, the center 605a of the circle 605, in the first position 610, can be located at a value equal to $Z_{nom}$. This value corresponds to a nominal impedance of the group of capacitors 222. For example, $Z_{nom}$ can correspond to an expected impedance of the group at the time of commissioning, initializing, or re-energizing the capacitor bank 220.

In the second position 615, the center 605a of the circle 605 is located at a value equal to $Z_{n,TCadj}$. As described previously, in connection with steps 535 and 540 of FIG. 5, $Z_{n,TCadj}$ corresponds to an impedance level that has been adjusted to compensate for temperature variations across groups of capacitors 222 in the capacitor bank 220. Moving the circle 605 from the first position 610 to the second position 615 calibrates the complex impedance plane 600 to account for those temperature variations. Such calibration allows the complex impedance plane to be a more accurate tool for detecting system failures within the capacitor bank 220.

Figure 7:
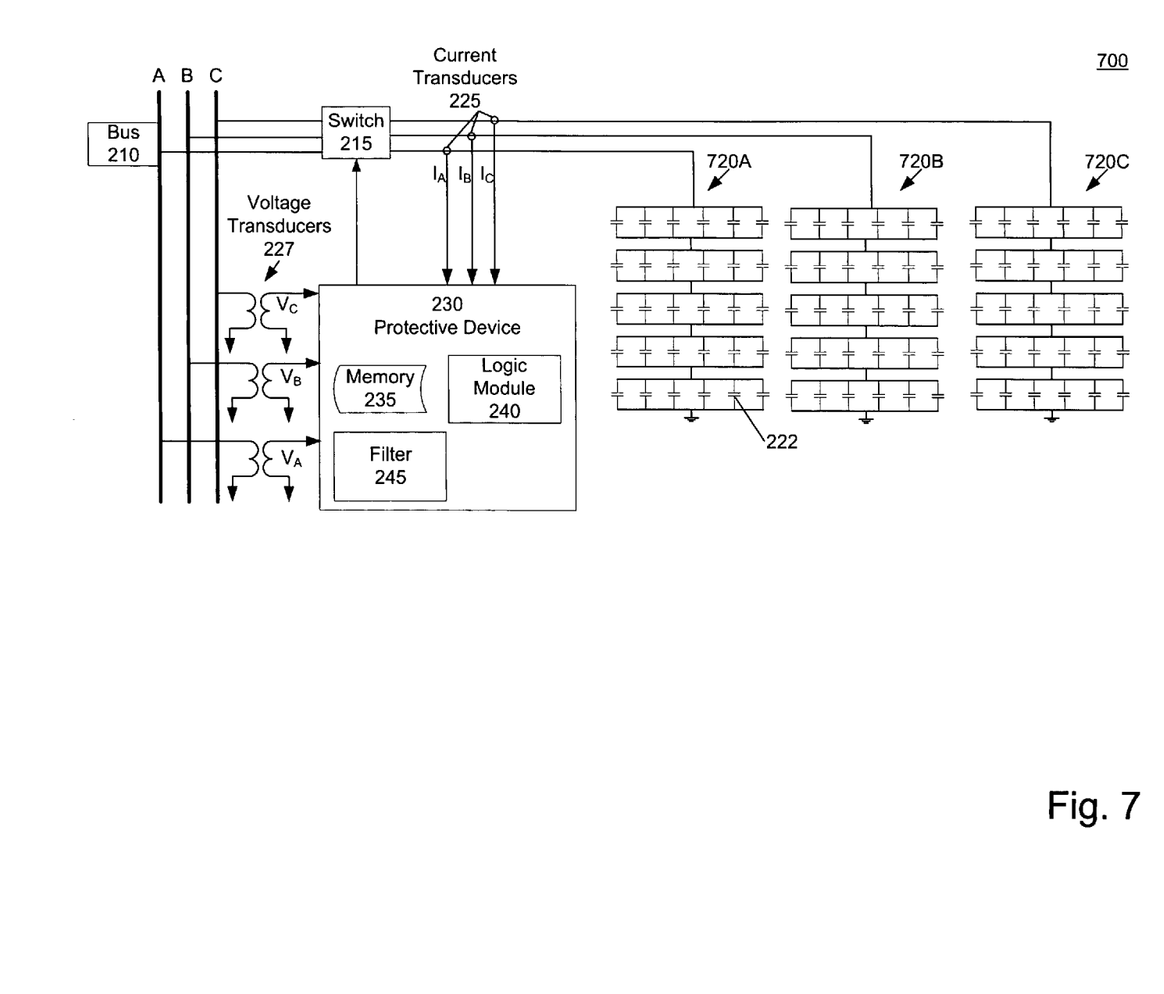
FIG. 7 is a block diagram depicting a system for protecting an electric device using temperature compensation, in accordance with certain alternative exemplary embodiments.

FIG. 7 is a block diagram depicting a system 700 for protecting an electric device using temperature compensation, in accordance with certain alternative exemplary embodiments. With reference to FIGS. 2 and 7, the system 700 is similar to the system 200, except that the system 200 includes a fuseless capacitor bank 220, and the system 700 includes externally fused capacitor units 720 arranged in a different matrix design. Each capacitor unit 720A, 720B, and 720C corresponds to a different phase A, B, and C, respectively, of power from a bus 210.

The protective device 230 of the system 700 is configured to permit impedance measurement on a per-phase A, B, and C basis. In the system 700, current transducers 225 are configured to measure a totalized phase current for each of the phases A, B, and C. Similarly, voltage transducers 227 are configured to measure voltage from phase to ground for each phase A, B, and C. A measured impedance for each phase A, B, and C can be calculated as follows Measured Phase Impedance=$Z_{meas,n}=V_n \div I_n$, where "n" represents the nth phase A, B, and C. The system 700 is configured to perform of FIGS. 3-5

The protective device 230 and logic module 240 thereof are configured to perform each of the methods 300, 310, and 315 with the system 700, substantially as described previously with the system 200. For example, similar to the calculation of step 510 of FIG. 5, the logic module 240 can calculate an average impedance value to use to adjust a complex impedance plane associated with phase B, as follows:

$$Z_{avg,2} = \frac{Z_1 + Z_3}{2} = \frac{1}{2}\left(\frac{V_1}{I_1} + \frac{V_3}{I_3}\right).$$

Temperature dependency, which influences all phases A, B, and C more or less equally, is manifest in the average.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A method for protecting an electric device, comprising the steps of:
   selecting one of a plurality of capacitor groups;
   measuring an average impedance of all of the capacitor groups except for the selected capacitor group; and
   adjusting a complex impedance plane associated with the selected capacitor group based on the measured average impedance.

2. The method of claim 1, wherein each of the capacitor groups comprises at least one capacitor.

3. The method of claim 1, wherein the plurality of capacitor groups comprises at least two capacitor groups.

4. The method of claim 1, wherein each of the capacitor groups comprises a string of capacitors associated with the same phase of electric power.

5. The method of claim 1, wherein each of the capacitor groups is associated with a different phase of electric power.

6. The method of claim 1, wherein the step of adjusting the complex impedance plane comprises the step of moving a center ("Zcenter") of a circle of the complex impedance plane.

7. The method of claim 6, wherein the step of adjusting the complex impedance plane further comprises the steps of:
   reading a reference impedance value;
   calculating a difference between the measured average impedance and the reference impedance value; and
   moving Zcenter based on the calculated difference.

8. The method of claim 7, wherein the step of adjusting the complex impedance plane further comprises the step of filtering the calculated difference using a low pass filter, and wherein the step of moving Zcenter based on the calculated difference comprises the step of moving Zcenter based on the filtered calculated difference.

9. The method of claim 8, wherein the low pass filter comprises a digital component configured to filter input according to an established time factor.

10. The method of claim 1, further comprising the step of storing the adjusted complex impedance plane in a computer readable memory.

11. The method of claim 1, further comprising the steps of:
   plotting a measured impedance of the selected capacitor group on the adjusted complex impedance plane;
   determining whether the plotted measured impedance is within a circle of the adjusted complex impedance plane; and
   outputting a notification comprising information regarding a failure in the selected capacitor group in response to determining that the plotted measured impedance is not within the circle.

12. A method for protecting an electric device, comprising the steps of:
   selecting one of a plurality of capacitor groups;
   measuring an average impedance of all of the capacitor groups except for the selected capacitor group;
   calculating a difference between the measured average impedance and a reference impedance value; and
   adjusting a complex impedance plane associated with the selected capacitor group based on the calculated difference.

13. The method of claim 12, wherein each of the capacitor groups comprises at least one capacitor.

14. The method of claim 12, wherein the plurality of capacitor groups comprises at least two capacitor groups.

15. The method of claim 12, wherein each of the capacitor groups comprises a string of capacitors associated with the same phase of electric power.

16. The method of claim 12, wherein each of the capacitor groups is associated with a different phase of electric power.

17. The method of claim 12, wherein the step of adjusting the complex impedance plane comprises the step of moving a center of a circle of the complex impedance plane.

18. The method of claim 12, further comprising the step of filtering the calculated difference using a low pass filter, and
   wherein the step of adjusting the complex impedance plane comprises the step of adjusting the complex impedance plane based on the filtered calculated difference.

19. The method of claim 18, wherein the low pass filter comprises a digital component configured to filter input according to an established time factor.

20. The method of claim 12, further comprising the step of storing the adjusted complex impedance plane in a computer readable memory.

21. The method of claim 12, further comprising the steps of:
   plotting a measured impedance of the selected capacitor group on the adjusted complex impedance plane;
   determining whether the plotted measured impedance is within a circle of the adjusted complex impedance plane; and
   outputting a notification comprising information regarding a failure in the selected capacitor group in response to determining that the plotted measured impedance is not within the circle.

22. A system for protecting an electric device, comprising:
   a logic module configured to
      select one of a plurality of capacitor groups,
      measure an average impedance of at least one of the capacitor groups except for the selected capacitor group, and
      calculate a difference between the measured average impedance and a reference impedance value; and
   a low pass filter coupled to the logic module, the low pass filter being configured to filter the calculated difference according to an established time factor,
   wherein the logic module is further configured to adjust a complex impedance plane associated with the selected capacitor group based on the filtered difference.

23. The system of claim 22, wherein each of the capacitor groups comprises at least one capacitor.

24. The system of claim 22, wherein the plurality of capacitor groups comprises at least two capacitor groups.

25. The system of claim 22, further comprising a computer readable memory coupled to the logic module, wherein the logic module is configured to store the adjusted complex impedance plane within the computer readable memory.

26. The system of claim 22, wherein the logic module is configured to adjust the complex impedance plane by moving a center of a circle of the complex impedance plane.

27. The system of claim 22, wherein each of the capacitor groups comprises a string of capacitors associated with the same phase of electric power.

28. The system of claim 22, wherein each of the capacitor groups is associated with a different phase of electric power.

29. The system of claim 22, wherein the logic module is further configured to:
   plot a measured impedance of the selected capacitor group on the adjusted complex impedance plane;
   determine whether the plotted measured impedance is within a circle of the adjusted complex impedance plane; and
   output a notification comprising information regarding a failure in the selected capacitor group in response to determining that the plotted measured impedance is not within the circle.

* * * * *